(12) United States Patent
Hildebrandt et al.

(10) Patent No.: US 12,508,652 B2
(45) Date of Patent: Dec. 30, 2025

(54) METHOD AND APPARATUS FOR ADDITIVE MANUFACTURING UNDER PROTECTIVE GAS

(71) Applicant: Messer SE & Co. KGaA, Bad Soden (DE)

(72) Inventors: Bernd Hildebrandt, Tönisvorst (DE); Dirk Kampffmeyer, Linnich (DE)

(73) Assignee: MESSER SE & CO. KGAA, Bad Soden (DE)

( * ) Notice: Subject to any disclaimer, the term of this patent is extended or adjusted under 35 U.S.C. 154(b) by 480 days.

(21) Appl. No.: 18/000,754

(22) PCT Filed: Jun. 2, 2021

(86) PCT No.: PCT/EP2021/064789
§ 371 (c)(1),
(2) Date: Dec. 5, 2022

(87) PCT Pub. No.: WO2021/245134
PCT Pub. Date: Dec. 9, 2021

(65) Prior Publication Data
US 2023/0211419 A1    Jul. 6, 2023

(30) Foreign Application Priority Data
Jun. 6, 2020    (DE) .................. 10 2020 003 426.8

(51) Int. Cl.
*B22F 10/32*    (2021.01)
*B22F 10/28*    (2021.01)
(Continued)

(52) U.S. Cl.
CPC ............. *B22F 10/32* (2021.01); *B22F 10/28* (2021.01); *B22F 10/64* (2021.01); *B22F 12/70* (2021.01);
(Continued)

(58) Field of Classification Search
CPC .......... B22F 10/32; B22F 10/28; B22F 10/64; B22F 12/70; B22F 2201/10;
(Continued)

(56) References Cited

U.S. PATENT DOCUMENTS

| | | | |
|---|---|---|---|
| 5,182,170 A | 1/1993 | Marcus et al. | |
| 2014/0034626 A1* | 2/2014 | Illston | C22C 19/055 |
| | | | 419/49 |

(Continued)

FOREIGN PATENT DOCUMENTS

| | | |
|---|---|---|
| DE | 102007059865 A1 | 6/2009 |
| EP | 3006138 A1 | 4/2016 |

(Continued)

OTHER PUBLICATIONS

Kampffmeyer, Dirk et al., "Device and Method For Additive Manufacturing Under Protective Gas", U.S. Appl. No. 18/002,317, filed Dec. 19, 2022 (specification, claims and drawings only).

(Continued)

*Primary Examiner* — Ricardo D Morales
(74) *Attorney, Agent, or Firm* — Andrus Intellectual Property Law, LLP

(57) ABSTRACT

The invention relates to a method for additive manufacture of a workpiece under protective gas, wherein a workpiece is assembled from a sequence of workpiece contours, each of which is manufactured by selective sintering or melting of a powdery or wire-like material by applying an energy beam thereto, wherein a workpiece contour is manufactured under the effect of a protective gas consisting of carbon dioxide and an inert gas. According to the invention, the chemical composition of each workpiece contour is modified according to a specified program by variation of the composition of the protective gas. Heat treatment occurring after manufacture of the workpiece contour provides for defined mechani- (Continued)

cal and technological quality values of the workpiece contour. A workpiece having zones with defined mechanical and technological quality values is produced in this manner.

16 Claims, 1 Drawing Sheet

(51) Int. Cl.
| | |
|---|---|
| *B22F 10/64* | (2021.01) |
| *B22F 12/70* | (2021.01) |
| *B23K 26/342* | (2014.01) |
| *B23K 103/04* | (2006.01) |
| *B33Y 10/00* | (2015.01) |
| *B33Y 30/00* | (2015.01) |
| *B33Y 40/20* | (2020.01) |

(52) U.S. Cl.
CPC ............ *B23K 26/342* (2015.10); *B33Y 10/00* (2014.12); *B33Y 30/00* (2014.12); *B33Y 40/20* (2020.01); *B22F 2201/10* (2013.01); *B23K 2103/04* (2018.08)

(58) Field of Classification Search
CPC .... B22F 2999/00; B22F 10/25; B23K 26/342; B23K 2103/04; B23K 15/0086; B23K 35/383; B23K 28/003; B23K 35/308; B23K 26/125; B23K 26/127; B33Y 10/00; B33Y 30/00; B33Y 40/20; Y02P 10/25
See application file for complete search history.

(56) References Cited

U.S. PATENT DOCUMENTS

| | | | |
|---|---|---|---|
| 2018/0065209 A1* | 3/2018 | Foret | B33Y 50/02 |
| 2018/0133956 A1* | 5/2018 | Buller | B33Y 50/02 |

FOREIGN PATENT DOCUMENTS

| | | |
|---|---|---|
| EP | 3628420 A1 | 4/2020 |
| WO | 2016196382 A1 | 12/2016 |

OTHER PUBLICATIONS

Bockler, Thomas et al., "Method For Finishing A Workpiece Made By Additive Manufacturing", U.S. Appl. No. 17/291,137, filed May 4, 2021 (specification, claims and drawings only).
International Search Report and Written Opinion in PCT/EP2021/064789, dated Oct. 19, 2021, 6 pages.

* cited by examiner

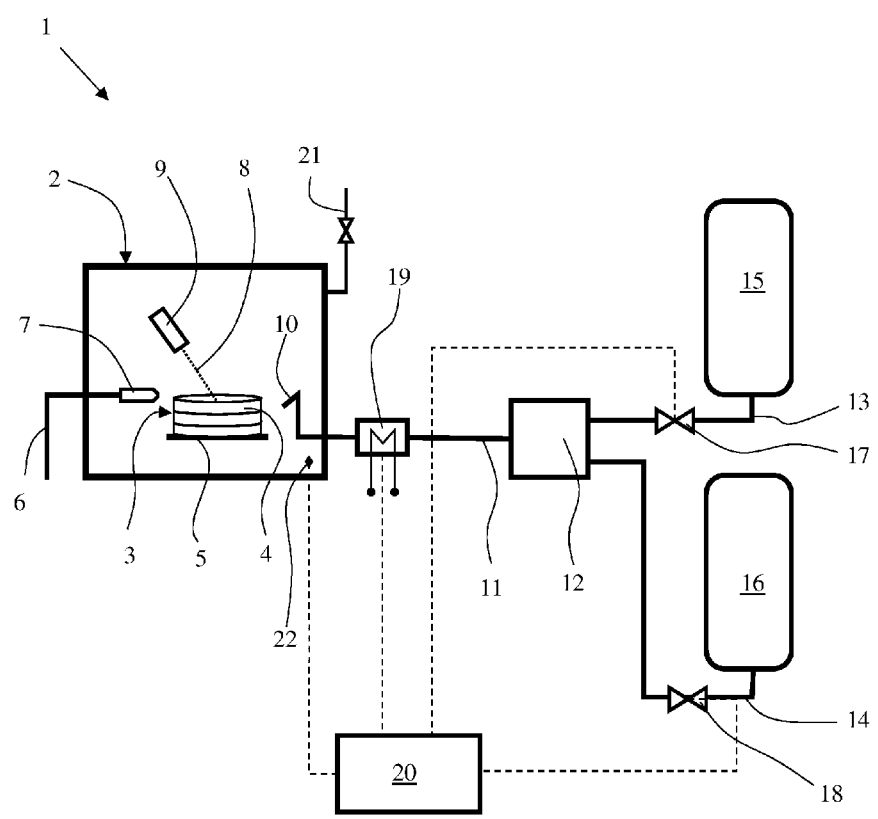

METHOD AND APPARATUS FOR ADDITIVE MANUFACTURING UNDER PROTECTIVE GAS

CROSS-REFERENCE TO RELATED APPLICATIONS

The present application is the U.S. national stage application of international application PCT/EP2021/064789, filed Jun. 2, 2021, which international application was published on Dec. 9, 2021, as International Publication WO 2021/245134 A1. The international application claims priority to German Patent Application No. 10 2020 003 426.8 filed Jun. 6, 2020.

FIELD

The invention relates to a method of additive manufacture of a workpiece under protective gas, in which a workpiece is assembled from a sequence of workpiece outlines that are each manufactured by melting a metallic material in powder or wire form by contacting with an energy beam, where the workpiece outlines are manufactured under the action of a protective gas with a composition that varies during the manufacture of the workpiece.

BACKGROUND

In modern production, there is an increasing trend toward additive manufacturing methods. These generally refer here to manufacturing methods in which a three-dimensional workpiece is produced layer by layer from a material composed of metal or plastic by the action of an energy beam.

In powder-based additive manufacturing methods, a pulverulent material is applied in a thin layer to a working surface. By means of an energy beam, especially a laser beam, an electron beam or a light arc, the material is melted or sintered precisely according to a computer-assisted model. The region in which the material is melted or sintered by the energy beam is also referred to hereinafter as "printing process zone". The molten or sintered material, on resolidification, forms a fixed outline (also called "workpiece outline" here), which is assembled together with outlines produced in the same way beforehand and/or subsequently to form a workpiece. In this way, it is especially possible to form shaped bodies that have a three-dimensional structure which is highly complex in some cases. Powder-based additive manufacturing methods that work with laser radiation as the energy source are especially laser powder bed fusion (L-PBF) or selective laser sintering (SLS). Additive manufacturing methods with an electron beam as energy beam are especially selective electron beam melting (SEBM) or selective electron beam sintering (SEBS). In addition, powder spraying methods are used. The pulverulent material here is fed in by means of a carrier gas. Powder spraying using a laser as energy source is known by the name powder-based laser metal deposition (LMD-P, laser metal deposition-powder). An alternative name in common use for LMD is also DED (direct energy deposition).

Rather than a pulverulent starting material, it is also possible to use a melting wire electrode as material, as in the case, for example, of wire arc additive manufacturing (WAAM) or wire-based laser metal deposition (LMD-W, laser metal deposition-wire). LMD-P and LMD-W are usually referred to collectively as LMD, laser metal deposition.

In order to protect the workpiece and the material from adverse effects from the surrounding atmosphere, powder- or wire-based additive manufacturing methods, both in the case of metallic and polymeric materials, usually take place under reduced pressure or under protective gas. The manufacturing is frequently effected in a gastight chamber, referred to here as "manufacturing chamber", or else often as "build chamber", which in the latter case is flooded with protective gas before and/or during the manufacture. Alternatively or additionally, the printing process zone is charged with protective gas by means of a protective gas nozzle, wherein an atmosphere of a defined protective gas is built up in a region of the printing process zone or around it.

A protective gas used is frequently an inert gas, such as argon, helium, or a mixture of argon and helium, as known, for example, from EP 3 628 420 A1 or DE 10 2007 059 865 A1. The latter describes a method of additive manufacture in which material properties of the material are altered during the manufacturing process by a heat treatment, a cold treatment and/or via the composition of a protective gas consisting of helium and argon.

Also known as well as the use of inert gases is the use of active gases that react with the material and hence can influence the chemical composition of the material.

For example, U.S. Pat. No. 5,182,170 A1 describes a method of additive manufacture in which a pulverulent starting material composed of a ceramic or nonferrous material is sintered layer by layer while being exposed to a reactive gas atmosphere containing nitrogen, oxygen and/or methane. The intention of doing so is to subject the different workpiece outlines to chemical modification via nitridation, oxidation and/or carburization.

EP 3 006 138 A1 describes a method of additive manufacture by means of a laser beam using a process gas. In order to be able to bond regions or layers having different chemical or metallurgical properties in the course of additive manufacture, without giving rise to "metallic notches" in the finished workpiece, i.e. abrupt hard transitions in metallurgical properties that can lead to fractures or defects in the microstructure, the process gas used contains a reactive gas, such as hydrogen, oxygen, carbon dioxide, carbon monoxide, nitrogen or a hydrocarbon. The gas composition used for adjacent metallurgical layers is altered here such that the metallurgical properties of these layers are matched to one another and the formation of metallurgical notches is prevented in this way. For instance, the use of carbon dioxide having a proportion in the process gas up to 5000 ppm serves to match properties such as hardness and/or wear resistance of a metallurgical layer to the respective adjacent layer. However, the protective gases used in the subject matter of EP 3 006 138 A1 do not serve to fix the metallurgical properties of the layers as such, but to create steady transitions between adjacent layers consisting of different materials with regard to particular metallurgical properties.

Use of active gases is incidentally also known, for example, from metal-active gas welding. However, while the active gas in that case can influence only the metallurgical properties of the workpiece within a certain penetration depth in the region of the weld seam, the protective gas is present throughout the entire additive manufacturing method; its composition can therefore affect the metallurgical properties of the whole workpiece or a workpiece outline as a whole.

In modern manufacturing processes, there is ever greater demand for components having zones having different quality values in terms of mechanical technology. Such components are nowadays usually assembled from multiple separately produced individual components having the respective desired properties. However, this procedure is exceedingly time-consuming and laborious.

It is therefore an object of the present invention to specify a method of producing a workpiece having different zones of various metallurgical properties, said method being performable simply and rapidly in relation to apparatus complexity, labor and time.

SUMMARY

The invention thus comprises forming a workpiece from workpiece outlines that are each intended to have metallurgical properties fixed beforehand that have been determined by a defined program or workpiece design. The workpiece outlines are produced by means of additive manufacturing from a material in powder or wire form which is uniform for all workpiece outlines; therefore, the metallurgical properties are adjusted exclusively via the action of the protective gas, the composition of which is fixed separately by a defined program for each workpiece outline. According to the invention, all that is varied is the carbon dioxide content of the protective gas composed of carbon dioxide and an inert gas in accordance with the composition required by the program, preferably by means of an automatic controller. The effect of the interaction of the protective gas with the melt is carburization or decarburization of the material, depending on the carbon content of the melt and the carbon dioxide content of the protective gas. In interaction with an inventive heat treatment involving austenitization and defined cooling (tempering) that proceeds during and/or after the manufacture of the workpiece outline, the metal microstructure of the respective workpiece outline is altered in a controlled manner, and the desired quality values in terms of mechanical technology are established in a controlled manner. The workpiece assembled from the workpiece outlines thus has well-defined zones of different but exactly defined quality values in terms of mechanical technology.

The workpiece outlines are manufactured in a known manner by melting the workpiece under the action of an energy beam. The material used is a metallic material, preferably a ferritic or martensitic steel material; a suitable energy beam for the method of the invention is preferably a laser beam, an electron beam or a light arc.

The corresponding protective gas is preferably produced directly in situ in the required composition. For this purpose, inert gas and carbon dioxide are stored in separate vessels and fed to a gas mixer for production of the protective gas, in which they are mixed in the respectively required composition according to a defined program. The protective gas is then, optionally after purging of the printing process zone or the manufacturing chamber, fed to the workpiece outline to be manufactured together with the/another inert gas.

The carbon dioxide content in the protective gas should preferably be constantly above 1% by volume throughout the additive manufacturing process. In a particularly advantageous configuration of the invention, the carbon dioxide content in the protective gas in the manufacture of all workpiece outlines is between 2% and 25% by volume. The inert gas content of the protective gas preferably consists of argon, helium, nitrogen or a mixture of two or three of these gases. The composition of the inert gas preferably remains constant throughout the additive manufacturing process, such that it is necessary to provide only one vessel each for the carbon dioxide and for the inert gas (or the inert gas mixture) for the production of the protective gas.

The protective gas atmosphere is produced in a manner known per se in a manufacturing chamber equipped with a protective gas feed; in this case, the entire manufacturing chamber is flooded with the corresponding protective gas. Alternatively, the protective gas is discharged by means of a protective gas nozzle in the direction of the printing process zone or workpiece outline. In this case, a manufacturing chamber surrounding the printing process zone is not absolutely required, but is not ruled out either. Especially in the case of the LMD or WAAM method, no manufacturing chamber is required.

The additive manufacturing method used in the printing process zone is preferably a laser-based manufacturing method, for example an L-PBF or LMD method, or an arc-based method, such as the WAAM method. The material being used may be supplied here in the form of a powder or in the form of a wire.

Impurities in the protective gas, especially proportions of oxygen and moisture, should be avoided. Especially in manufacturing methods in which a laser beam is used as the energy beam, high purities of the carbon dioxide and of the inert gas are essential for a good manufacturing outcome. In this case, the inert gas and the carbon dioxide in the protective gas preferably have a purity of in each case at least 99.99% by volume, preferably at least 99.995% by volume; in the case that a mixture of multiple inert gases is used, this degree of purity is applicable to the corresponding mixture. If a WAAM method is used, on account of the higher energy input and the associated greater melt volume, a purity according to ISO 14175 is sufficient, i.e. a proportion of impurities of up to 2000 vpm in the carbon dioxide or 1000 vpm in the inert gas.

In order to enable preferably sparing use of the gases used with employment of a manufacturing chamber, a further configuration of the invention envisages that the composition of the protective gas in the manufacturing chamber is measured during and/or after completion of the manufacturing of a workpiece outline and this is used to ascertain a correction value for the required protective gas composition for the manufacture of the subsequent workpiece outline. Prior to the manufacture of the subsequent workpiece outline, an amount of carbon dioxide or inert gas corresponding to the correction value is then fed in until the required composition of the atmosphere in the manufacturing chamber has been attained. In this case, in general, it is unnecessary to purge the manufacturing chamber fully with inert gas before a workpiece outline is manufactured.

The object of the invention is also achieved by an apparatus for additive manufacturing of workpieces under protective gas.

An apparatus of the invention, which especially enables the performance of the method of the invention, comprises a printing process zone intended for manufacture of a workpiece outline, a device for feeding a material in powder or wire form to the printing process zone, a device for generating an energy beam that acts on the printing process zone, and a device for generating a protective gas atmosphere in the region of the printing process zone. According to the invention, the device for generating a protective gas atmosphere comprises a gas mixer having flow connection to a source of carbon dioxide and to a source of an inert gas, and a protective gas feed connected to the gas mixer for feeding the protective gas to the printing process zone. Additionally provided is a device for heat treatment of the workpiece outlines and/or the workpiece.

In the printing process zone, a workpiece is assembled from a sequence of workpiece outlines that are each manufactured by melting a metallic material in powder or wire form by contacting with an energy beam. The starting material in powder or wire form is the same for all workpiece outlines; in the manufacture of a workpiece outline, the carbon dioxide content in the protective gas consisting of carbon dioxide and an inert gas alters the chemical microstructure of the complete workpiece outline. This brings about a change in the quality values in terms of mechanical technology in the workpiece outline, but these only become controllable through a heat treatment.

In the gas mixer having flow connection via feeds to one source each for the inert gas and for carbon dioxide, the respective protective gas required is produced, and is then fed via the protective gas feed to the printing process zone.

In a preferred embodiment of the invention, the protective gas feed opens into a manufacturing chamber which is closable in a gastight manner and surrounds the printing process zone. In this case, the supply of the protective gas ensures the formation of a protective gas atmosphere throughout the manufacturing chamber. Incidentally, the manufacturing chamber itself may also serve as gas mixer and protective gas feed at the same time, in that the feeds for the inert gas and the carbon dioxide that are equipped with corresponding controllable valves open directly into the manufacturing chamber.

In another preferred configuration of the invention, the protective gas is guided directly to the printing process zone by means of a protective gas nozzle connected to the protective gas feed. The protective gas nozzle creates a protective gas atmosphere of the required composition within a restricted region around the printing process zone or workpiece outline. In this configuration, a manufacturing chamber surrounding the printing process zone is not required, but it is not ruled out either.

If the apparatus has a manufacturing chamber surrounding the printing process zone, the heat treatment can also be effected therein. This is enabled by a heating device mounted in the manufacturing chamber and/or in the protective gas feed, which is a preferably electrical heating device. The heating device is preferably controllable in such a way that defined temperatures and heating and cooling rates can be achieved in the atmosphere of the manufacturing chamber.

Alternatively, the heat treatment is effected in a separate heat treatment oven, which may be a protective gas oven or a vacuum oven. In this case, the workpiece outline to be treated is transported from the printing process zone to the heat treatment oven by means of a transport device, and after the heat treatment is transported back to the printing process zone for continuation of the manufacture of the workpiece. A heat treatment oven is required in any case when there is no manufacturing chamber.

Preferably, the apparatus of the invention is equipped with a control unit which has data connection to valves mounted in the feeds for carbon dioxide and/or inert gas, and with which the supply of carbon dioxide and/or inert gas to the gas mixture can be controlled by a defined programme. Appropriately, by means of the same or a separate control unit, it is also possible to control the heating output of the heating device and hence the temperature of the protective gas in any manufacturing chamber present or in a heat treatment oven during a heat treatment.

The device for generating an energy beam preferably comprises a laser, an electron beam cannon or a device for generating an arc.

A working example of the invention is to be elucidated hereinafter with reference to the drawing.

BRIEF DESCRIPTION OF THE DRAWING

The sole drawing (FIG. 1) shows a schematic of the construction of an apparatus of the invention.

DETAILED DESCRIPTION

The apparatus 1 shown in FIG. 1 comprises a gas-tight and thermally insulated manufacturing chamber 2 in which a workpiece 3 is being produced by means of additive manufacturing from individual workpiece outlines 4, in that a material is being selectively melted by the action of an energy beam. In the manufacturing chamber 2 there is a printing process zone 5, for example a manufacturing plate on which the workpiece outlines 4 are manufactured successively. A material—which is pulverulent in the working example—is supplied using a feed device 7 equipped with a material feed 6. The energy beam used in the working example is a laser beam 8 which is generated in a laser 9 and is directed onto the printing process zone 5. Rather than a laser beam 8, incidentally, it is also possible to use an electron beam or a light arc as energy beam.

In the manufacturing chamber 2, a protective gas feed 11 ends in a protective gas nozzle 10. The protective gas feed 11 establishes a flow connection to a gas mixer 12, which has flow connection via feeds 13, 14 to one source 15 each for carbon dioxide and to a source 16 for an inert gas. The sources 15, 16 are each, for example, a pressure vessel or a tank. Valves 17, 18 enable the restriction of the gas stream fed through each of feeds 13, 14. Disposed in the protective gas feed 11 in the working example shown here is an electoral heating device 19. The valves 17, 18 and the heating device 19 are in data connection to a control unit 20. An offgas conduit 21 enables the removal of gas from the manufacturing chamber 2.

Incidentally, in accordance with the invention, the provision of a manufacturing chamber 2 for formation of a protective gas atmosphere in the region of the printing process zone 5 is not absolutely necessary. It is also conceivable that the protective gas is merely guided to the printing process zone 5 by means of the protective gas nozzle 10 in order to form a defined protective gas atmosphere in a region around the printing process zone 5.

In the use of the apparatus 1, the workpiece 3 is produced by means of additive manufacture in a manner known per se. This involves creating a layer of a pulverulent material stored in a vessel (not shown here) in the printing process zone 5 by means of the feed device 7, and then melting it fully or partly by the action of the laser beam 8. The molten material, on resolidification, forms a solid workpiece outline 4 which is joined to workpiece outlines 4 produced in the same way beforehand and/or subsequently to give the workpiece 3. The pulverulent material being used here is the same for all workpiece outlines 4. The protective gas feed 11 is used to feed in a protective gas consisting of carbon dioxide and an inert gas, for example argon, helium or an Ar—He mixture.

In order to be able to manufacture a workpiece 3 with defined zones of different quality values in terms of mechanical technology, the composition of the protective gas for each workpiece outline 4 is varied specifically according to a predefined program depending on particular chemical and/or metallurgical properties desired for this workpiece outline 4. For this purpose, the ratio of carbon dioxide and inert gas fed in from the gas mixer 12 is controlled by means of the control unit 20 via the valves 17, 18. The mixture homogenized in the gas mixer 12 is then fed to the manufacturing chamber 2.

The chemical and/or metallurgical properties of the workpiece outline are altered here only via the variation in the carbon dioxide content in the protective gas. The greater this is, the more carbon is introduced into the melt (carburization), which can especially increase the hardness or tensile strength of the material after solidification thereof. With a small proportion of carbon dioxide in the protective gas, carbon diffuses out of the melt into the surrounding protective gas, and the hardness or tensile strength is reduced (decarburization). The carbon dioxide content can be varied here within a wide range of establishment of the desired metallurgical property, for example between 1% by volume and 100% by volume.

During and/or after the manufacture of the workpiece outline 4, there is a heat treatment of the workpiece outline 4. For this purpose, the protective gas fed to the manufacturing chamber is heated by means of the heating device 19 to a defined temperature and/or according to a defined temperature progression. The temperature is controlled here by means of the control unit 20, which, for this purpose, has data connection to a temperature sensor 22 within the manufacturing chamber 2. The heat treatment affords defined quality values in terms of mechanical technology in the workpiece outline. Alternatively, a heat treatment after the printing process is effected in a protective gas oven or vacuum oven (not shown here) which is separate from the manufacturing chamber 2; in this case, there is no need for the heating device 19. The metallurgical properties of the workpiece 3 can thus be adjusted accurately within the workpiece volume and hence adjusted to a given design with regard to its metallurgical properties; in particular, the metallurgical properties of the workpiece outlines within the workpiece 3 may be chosen differently from those at the surface.

The invention is especially suitable for the additive manufacture of tool steels and high-speed steels. In addition, the invention is suitable for all additive manufacturing methods, but especially for L-PDF, WAAM or LMD methods.

LIST OF REFERENCE NUMERALS 1 apparatus
2 manufacturing chamber
3 workpiece
4 workpiece outline
5 printing process zone
6 powder feed
7 feed device
8 laser beam
9 laser
10 protective gas nozzle
11 protective gas feed
12 gas mixer
13 feed
14 feed
15 source for carbon dioxide
16 source for inert gas
17 valve
18 valve
19 heating device
20 control unit
21 offgas conduit
22 temperature sensor

The invention claimed is:

1. A method of additive manufacture of a workpiece in a manufacturing chamber under protective gas, in which a workpiece is assembled from a sequence of workpiece outlines that are each manufactured by melting a metallic material in powder or wire form by contacting with an energy beam, where the workpiece outlines are manufactured under the action of a protective gas with a composition that varies during the manufacture of the workpiece;
    wherein zones of different metallurgical properties are created within the workpiece by using, as protective gas in the manufacture of each workpiece outline, a gas mixture consisting of an inert gas and carbon dioxide, the composition of which is determined in each case depending on defined metallurgical properties of the respective workpiece outline, and which is supplied in this composition before and/or during the manufacture of the workpiece outline; and
    wherein the workpiece outline is subjected to a heat treatment during and/or after manufacture, the heat treatment comprising heating the protective gas using a heating device in a protective gas supply line that provides the protective gas to the manufacturing chamber.

2. The method as claimed in claim 1, wherein the workpiece used is a ferritic or martensitic steel material.

3. The method as claimed in claim 1, wherein the carbon dioxide content of the protective gas is above 1% by volume.

4. The method as claimed in claim 1, wherein the carbon dioxide content in the protective gas is between 2% and 25% by volume.

5. The method as claimed in claim 1, wherein the inert gas used is argon, helium, nitrogen or a mixture of two or three of these gases.

6. The method as claimed in claim 1, wherein the additive manufacturing method used is an L-PBF method, an LMD method or a WAAM method.

7. The method as claimed in claim 1, wherein the energy beam used is a laser beam, and the inert gas and the carbon dioxide in the protective gas each have a purity of at least 99.99% by volume.

8. The method as claimed in claim 1, wherein the composition of the protective gas in the manufacturing chamber is measured constantly during the manufacturing process, this is used to ascertain a correction value for the protective gas composition, and a protective gas having a composition that takes into account the correction value is fed to the manufacturing chamber before and/or during the manufacture of the workpiece outline.

9. An apparatus for additive manufacture of workpieces under protective gas, in which a workpiece is assembled from a sequence of workpiece outlines, comprising:
    a printing process zone intended for manufacture of a workpiece outline;
    a device for feeding a material in powder or wire form to the printing process zone;
    a device for generating an energy beam that acts on the printing process zone; and
    a device for generating a protective gas atmosphere in the region of the printing process zone;
    wherein a device is provided for heat treatment of the workpiece outlines and/or the workpiece;
    wherein the device for generating the protective gas atmosphere comprises a gas mixer, a source of carbon dioxide, and a source of inert gas, and wherein a flow connection from the source of carbon dioxide to the gas mixer is controlled by a first valve and a flow connection from the source of inert gas to the gas mixer is controlled by a second valve; and wherein the gas mixer is flow-connected to the printing process zone via a protective gas feed.

10. The apparatus as claimed in claim 9, wherein the printing process zone is disposed in a manufacturing chamber which is closable in a gastight manner.

11. The apparatus as claimed in claim 10, wherein the device for heat treatment comprises a heating device in the protective gas feed of the manufacturing chamber, for generating a protective gas atmosphere of defined temperature in the manufacturing chamber.

12. The apparatus as claimed in claim 9, wherein the device for generating the protective gas atmosphere comprises a protective gas nozzle which is connected to the protective gas feed and is directed toward the printing process zone.

13. The apparatus as claimed in claim 9, wherein the device for heat treatment comprises a heat treatment oven operable with protective gas or under reduced pressure.

14. The apparatus as claimed in claim 11, wherein the device for generating the protective gas atmosphere and/or the heating device has a data connection to an automatic control unit by means of which the supply of carbon dioxide and/or inert gas in the gas mixer and/or the temperature of the protective gas in the manufacturing chamber is controllable.

15. The apparatus as claimed in claim 9, wherein the device for generating an energy beam comprises a laser, an electron beam cannon or a device for generating an arc.

16. The apparatus of claim 14, wherein the automatic control unit controls the first and second valves so as to control a ratio of carbon dioxide to inert gas provided to the gas mixer.

* * * * *